(12) United States Patent
Schillinger

(10) Patent No.: US 11,790,452 B2
(45) Date of Patent: Oct. 17, 2023

(54) COMPUTER IMPLEMENTED METHOD FOR COMPILING A PORTFOLIO OF ASSETS

(71) Applicant: Longview Financial Limited, Hong Kong (CN)

(72) Inventor: Julian Moritz Schillinger, Hong Kong (CN)

(73) Assignee: Longview Financial Limited, Pok Fu Lam (HK)

( * ) Notice: Subject to any disclaimer, the term of this patent is extended or adjusted under 35 U.S.C. 154(b) by 0 days.

(21) Appl. No.: 16/970,558

(22) PCT Filed: Sep. 20, 2019

(86) PCT No.: PCT/CN2019/107125
§ 371 (c)(1),
(2) Date: Aug. 17, 2020

(87) PCT Pub. No.: WO2020/057659
PCT Pub. Date: Mar. 26, 2020

(65) Prior Publication Data
US 2021/0201413 A1 Jul. 1, 2021

(30) Foreign Application Priority Data

Sep. 20, 2018 (HK) .................................. 18112164.5

(51) Int. Cl.
*G06Q 40/06* (2012.01)
*G06N 3/126* (2023.01)
(52) U.S. Cl.
CPC .............. *G06Q 40/06* (2013.01); *G06N 3/126* (2013.01)
(58) Field of Classification Search
CPC ................................ G06Q 40/06; G06N 3/126
See application file for complete search history.

(56) References Cited

U.S. PATENT DOCUMENTS

| 5,148,365 A | * | 9/1992 | Dembo | ................... | G06Q 10/06 |
| | | | | | 705/36 R |
| 6,175,824 B1 | * | 1/2001 | Breitzman | ............. | G06Q 40/06 |
| | | | | | 705/37 |

(Continued)

FOREIGN PATENT DOCUMENTS

| CN | 105809270 A | * | 7/2016 | ............. G06Q 10/04 |
| CN | 105809270 A | | 7/2016 | |

(Continued)

OTHER PUBLICATIONS

Sefiane et al.: Portfolio Selection using Genetic Algorithm, 2012, Munich Personal RePEc Archive (MPRA), pp. 1-12 (Year: 2012).*

(Continued)

*Primary Examiner* — Bijendra K Shrestha
(74) *Attorney, Agent, or Firm* — GableGotwals

(57) ABSTRACT

A computer implemented method for automatically compiling a portfolio of assets. The method includes generating a plurality of first generation portfolios of assets from a plurality of available assets, wherein each of said plurality of first generation portfolios is generated by random selection of one or more of the plurality of available assets. The method involves applying a random percentage weighting to each of the randomly selected assets, but where the sum of the random percentage weightings is arranged to equal 100%. It also involves calculating a score for each of the plurality of first generation portfolios of assets, the score for each of the plurality of first generation portfolios of assets comprising an aggregate of a plurality of different evaluation factors and ranking the plurality of first generation portfolios of assets by their respective scores. Then, one or more of the plurality of first generation portfolios of assets are selected based on their respective scores. The process is repeated through a plurality of iterations until a marginal improve- (Continued)

ment in a score for a highest ranked portfolio falls below a pre-set amount.

17 Claims, 11 Drawing Sheets

(56) References Cited

U.S. PATENT DOCUMENTS

| | | | |
|---|---|---|---|
| 2002/0091605 A1* | 7/2002 | Labe, Jr. | G06Q 10/04 |
| | | | 705/36 R |
| 2003/0018570 A1* | 1/2003 | McCabe | G06Q 40/06 |
| | | | 705/37 |
| 2004/0111350 A1* | 6/2004 | Charnley, Jr. | G06Q 40/06 |
| | | | 705/36 R |
| 2006/0167777 A1* | 7/2006 | Shkedy | G06Q 10/0639 |
| | | | 705/35 |
| 2009/0198633 A1* | 8/2009 | Howard | G06Q 10/10 |
| | | | 705/36 R |
| 2010/0268666 A1* | 10/2010 | Smith | G06Q 40/00 |
| | | | 705/36 R |
| 2012/0246095 A1 | 9/2012 | Michaud et al. | |
| 2013/0024395 A1* | 1/2013 | Clark | G06Q 40/06 |
| | | | 705/36 R |
| 2013/0054490 A1* | 2/2013 | McGarel | G06Q 40/06 |
| | | | 705/36 R |
| 2016/0055585 A1 | 2/2016 | Stearns | |
| 2016/0371779 A1* | 12/2016 | Stearns | G06Q 40/06 |
| 2021/0238689 A1* | 8/2021 | Cheung | G16B 30/00 |

FOREIGN PATENT DOCUMENTS

| | | | | |
|---|---|---|---|---|
| JP | 2005-1825580 A | * | 7/2005 | ............. G06Q 40/00 |
| JP | 2005182580 A | | 7/2005 | |
| WO | WO-2017216595 A2 | * | 12/2017 | .............. G06F 17/11 |

OTHER PUBLICATIONS

Rachchi, V.M: Introduction to Genetic Algorithm—Including Example Code, Jul. 7, 2017, Towards Data Science, pp. 1-15 (Year: 2017).*

Shapcott, J.: Index Tracking: Genetic Algorithms for Investment Portfolio Selection, Sep. 1992, pp. 1-25 (Year: 1992).*

Kakinoki et al.: Investment Strategy Optimization to Aim at Risk Management by Evolutionary Algorithm (English Translation), Sep. 15, 2009, ,IPSJ SICI Technical Report, vol. 2009-AL-I26, No. 9, pp. 1-9. (Year: 2009).*

Chang et al.: Portfolio Optimization Problems in Different Risk Measures Using Genetic Algorithm, 2009, Expert System with Application 36, pp. 10529-10537. (Year: 2009).*

Journal IPSJ SIG, "Technical Reports investment strategy optimization to aim at risk management by elvolutionary algorithm", , Publisher: Oct. 2009.

Chang et al, "Portfolio optimization problems in different risk measures using genetic algorithm", citation not enclosed due to copyright restrictions, Sep. 1, 2009, pp. 10529-10537, vol. 36, No. 7, Publisher: Expert Systems with Applications.

* cited by examiner

| | Weighted Fitness Factor 1 | Weighted Fitness Factor 2 | Weighted Fitness Factor 3 | ... | Fitness Score (Weighted Sum of all Factors) |
|---|---|---|---|---|---|
| Portfolio 1 | 0.13 | 0.29 | 0.14 | | 0.88 |
| Portfolio 2 | 0.10 | 0.07 | 0.03 | | 0.24 |
| Portfolio 3 | 0.34 | 0.16 | 0.21 | | 0.90 |
| ... | | | | | |
| Portfolio 254 | 0.01 | 0.01 | 0.00 | | 0.05 |
| Portfolio 255 | 0.03 | 0.06 | 0.05 | | 0.20 |
| Portfolio 256 | 0.29 | 0.18 | 0.31 | | 0.83 |

COMPUTER IMPLEMENTED METHOD FOR COMPILING A PORTFOLIO OF ASSETS

CROSS-REFERENCE TO RELATED TO APPLICATIONS

This application is the U.S. National Phase of PCT application No. PCT/CN2019/107125 filed 20 Sep. 2019 which claims priority to Hong Kong Patent Application No. 18112164.5 filed 20 Sep. 2018 each of which is incorporated therein by reference.

FIELD OF THE INVENTION

The invention relates to a computer implemented method for compiling a portfolio of assets based on a number of constraints and evaluation factors and, particularly, but not exclusively, to a computer implemented method for generating, creating or modifying a portfolio of financial assets such as stocks, bonds and/or funds with respect to quantitative and/or qualitative financial criteria.

BACKGROUND OF THE INVENTION

In modern portfolio theory, the efficient frontier (or portfolio frontier or Markowitz frontier) is an investment portfolio which occupies the 'efficient' parts of the risk-return spectrum. Formally, it is the set of portfolios which satisfies the condition that no other portfolio exists with a higher expected return, but with the same standard deviation of return.

A combination of assets, i.e. a portfolio, is referred to as "efficient" if it has the best possible expected generation of return for its generation of risk which is represented by the standard deviation of the portfolio's return. Here, every possible combination of risky assets can be plotted in a risk-expected return space and the collection of all such possible portfolios defines a region in this space. In the absence of the opportunity to hold a risk-free asset, this region is the opportunity set (the feasible set). A positively sloped (upward-sloped) top boundary of this region is a portion of a parabola and is called the "efficient frontier."

If a risk-free asset is also available, the opportunity set is larger, and its upper boundary, the efficient frontier, is a straight line segment emanating from the vertical axis at the value of the risk-free asset's return and tangent to the risky-assets-only opportunity set. All portfolios between the risk-free asset and the tangency portfolio are portfolios composed of risk-free assets and the tangency portfolio, while all portfolios on the linear frontier above and to the right of the tangency portfolio are generated by borrowing at the risk-free rate and investing the proceeds into the tangency portfolio.

The efficient frontier is, however, a one point in time frontier that does not account for evolving risks and return. This may lead to a portfolio being selected based on an efficient frontier calculated at a point in time based on historical risk and return data where the portfolio is selected in respect of a chosen or agreed risk generation in the expectation of a certain generation of return. However, the generations of risk and return evolve over time.

There is therefore a need for an improved method of identifying the most efficient or optimal combination of assets for a portfolio that takes account of evolving constraints and evaluation factors such as risks and returns.

OBJECTS OF THE INVENTION

An objective of the invention is to mitigate or obviate to some degree one or more problems associated with known methods of identifying combinations of assets for a portfolio, such as the large computational effort required, the risk of finding a local optimum only, or not being able to identify any goal criteria.

One skilled in the art will derive from the following description other objects of the invention. Therefore, the foregoing statements of object are not exhaustive and serve merely to illustrate some of the many objects of the present invention.

SUMMARY OF THE INVENTION

The invention particularly, but not exclusively, seeks improvement of the quality of a portfolio of financial assets such as stocks, bonds, funds, structured products or even insurances with respect to quantitative and/or qualitative financial criteria, using the concept of a genetic algorithm combined with an evolutionary iterative process of portfolio modification/alteration and subsequent evaluation of the quality of the financial portfolio via a scoring assessment method, i.e. a "fitness" scoring or evaluation method.

It is envisaged that the invention will help to derive an investment portfolio proposal for financial investors based on a number of inputs and constraints. Asset/portfolio rebalancing recommendations emanating from this invention could be used to propose a portfolio of financial assets for investors looking to invest in various financial investment assets or re-assessing their current distributions in financial assets. The scope of the evaluation of this invention encompasses financial wealth management assets ("financial assets") including Mutual Funds ("MF"), bonds, structured notes, insurance, exchange-traded assets (typically stocks, Exchange Traded Funds (ETFs), etc.), and cash assets (e.g. deposits, savings/checking accounts).

It should be noted, however, that the method of the invention can be applied to other complex situations where a plurality of available assets need to be combined in an efficient or optimum manner to address a situation exhibiting a number of constraints and evaluation factors. One such situation is disaster relief where a combination of human resources, medical equipment, medicines, rescue equipment, accommodation, logistical support need to determined and combined having regard to constraints such as funds available, personnel available, modes of transport, regulatory requirements, timing, etc. With a defined set of constraints/evaluation factors, the method of the invention enables the evolution of an optimum or at least an improved disaster relief package based on an initial human generated proposal, although in some instances an empty proposal could comprise the initial proposal. Consequently, the invention is also applicable to the evaluation of a population of solutions including technical and/or logistical solutions in order to evolve to an improved or optimal solution.

In a first main aspect, the invention provides a computer implemented method for automatically compiling a portfolio of assets. The method comprises the steps including generating a plurality of first generation portfolios of assets from a plurality of available assets, wherein each of said plurality of first generation portfolios is generated by random selection of one or more of said plurality of available assets. The method involves applying a random percentage weighting to each of said randomly selected assets for each generated portfolio, but where the sum of the random percentage weightings is arranged to equal 100%. It also involves calculating a score for each of the plurality of first generation portfolios of assets, the score for each of said plurality of first generation portfolios of assets preferably comprising a fitness score based on an aggregate of a plurality of different evaluation factors and then ranking the plurality of first generation portfolios of assets by their respective scores. Subsequently, one or more of said plurality of first generation portfolios of assets are selected based on their respective scores. The process is repeated through a plurality of iterations until a marginal improvement in a score for a highest ranked portfolio falls below a pre-set, selected or calculated amount. The highest ranked portfolio satisfying this condition may then be selected for implementation. The process can also be repeated periodically using an implemented highest ranked portfolio as an initial portfolio of assets, i.e. as a 'starting' or 'seed' portfolio.

In a second main aspect, the invention provides a non-transitory computer readable medium storing machine readable code which, when executed by a processor, causes an electronic processing device to implement the steps of the first main aspect.

In a third main aspect, the invention provides a computer based system for automatically compiling a portfolio of assets, the system comprising a computer readable medium storing machine readable code and a processor configured to execute said machine readable code to implement the steps of the first main aspect.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
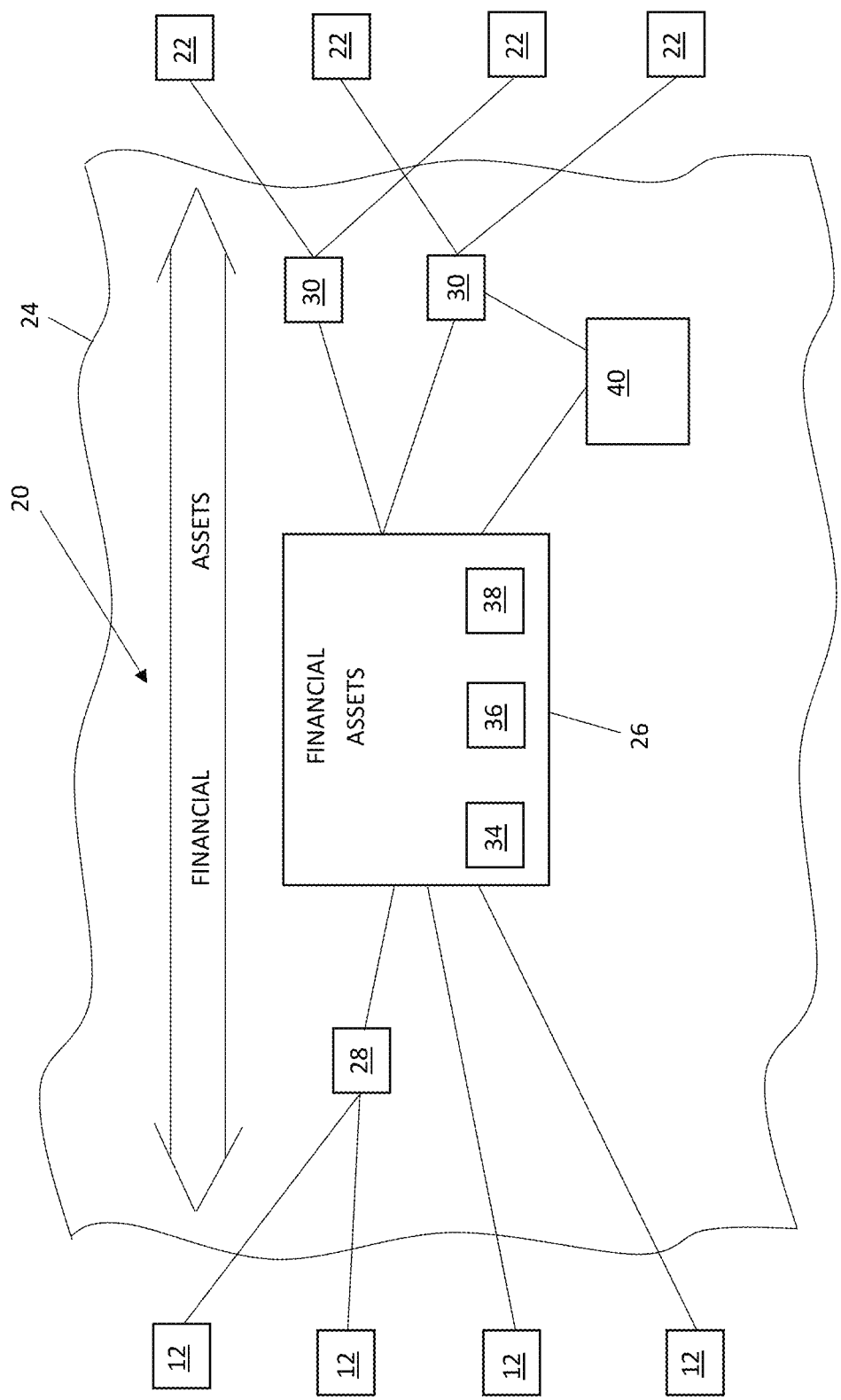
FIG. 1 is a diagram of a first embodiment of a computer based system implementing the method of the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS., may be implemented in various forms of hardware, software or combinations thereof. Preferably, these elements are implemented in a combination of hardware and software on one or more appropriately programmed general-purpose devices, which may include a processor, memory and input/output interfaces.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In general, the invention comprises a computer-based system and process which uses a genetic optimization algorithm to allow construction of portfolios of assets, particularly portfolios of financial assets, based on a machine-based mathematical optimization process which uses the concept of a genetic algorithm with evaluation of the portfolio using a mathematical "fitness" function. The invention seeks to find the portfolio with the highest "fitness" score. The initial input can be an existing or already implemented portfolio of financial assets, which will subsequently get optimized or at least improved, or a portfolio entirely comprising of cash, or a mix of both.

In the context of the invention, "fitness" may be calculated as an aggregate, preferably a weighted aggregate, of a number of fitness factors explained more fully below. The factors may comprise mathematical functions which may each be measures of a different criterion of the evaluated portfolio. The weights of the factors may be determined based on their respective contexts. Each of these factors may be a parameter of the aggregate fitness score and therefore there may be trade-offs between them.

The genetic algorithm may comprise a method for solving both constrained and unconstrained optimization problems and may be based on natural selection, the process that drives biological evolution. The genetic algorithm preferably is arranged to repeatedly modify a population of individual solutions, referred to herein as portfolios. At each step, the genetic algorithm is arranged to select individual portfolios with higher fitness within the current population to be set as parents and uses them to produce the offspring, e.g. child portfolios, for then generating the next generation of portfolios. Over successive generations, the population "evolves" toward an improved or optimal solution.

For portfolio construction, the algorithm applies three main principles of evolution, namely "crossover", "mutation" and "selection". One of the key assumptions is that this heuristic approach will be able to find the global optimum within the solution space/surface despite a potentially huge amount of potential solutions. The solution space is an n-dimensional space with n being the number of fitness factors to be evaluated. Within that space, certain constraints can be imposed to cater for restrictions/limitations for investment choices or indeed for any choices relating to a complex situation.

Portfolios are evaluated based on their fitness according to predetermined fitness criteria. The optimization process can take an initial input portfolio, which might comprise an investor's current portfolio, as a starting point, and evaluate its fitness. A genetic optimization process is used to try to find an alternative financial portfolio with a better or even optimum fitness score. In general, for the genetic optimization process, a larger population and a larger set of portfolio generations (next portfolio generations) should provide a better result, i.e. this should increase the likelihood of finding a better solution or even the global optimum in the solution space, but at the cost of some additional computational calculation/run-time for the algorithm. The process of mutation itself increases the variation of results from generation to generation. Depending on the surface of the solution space, this is more likely to bring the results closer to the optimal solution where the solution surface is very unsteady (i.e. has an increasing likelihood to move away from a local optimum, which is not the global optimum), but can also lead to more unstable results where the solution space/surface is very smooth/steady.

The fitness score itself is preferably a weighted sum of the scores of the individual factors and hence depends on the weights set for each of those factors. A larger weight for a particular factor will typically put more emphasis on finding a solution that meets this particular fitness criterion, i.e. has a higher score for that particular factor. Some factors can have an offsetting character (e.g. optimizing for keeping as many existing assets as possible vs. optimizing to have as many 'preferred' assets as possible), and some factors may have a mutually amplifying character in certain scenarios. However, in general, the factors are designed in a fashion that makes them mostly independent and uncorrelated. That means, the output should be stable from a regression point of view when the input is changed marginally.

Referring to FIG. 1, shown by way of example only is a schematic diagram of a first embodiment of a computer based system 20 in which the method of the invention can be applied. The computer based system 20 comprises a plurality of client devices 12 connected by a communications network such as the internet 24 to a server system 26. The client devices 12 may be directly connected to the server system 26 or may connect through an intermediary system 28 such as a financial advisor system or broker system. It will be understood that a client device 12 is not limited to a device operated by an individual investor, but may be representative of an institutional investor, an advisor investor or any other third party wishing to invest in a portfolio or portfolios of assets.

It will be appreciated that, whilst the embodiments described herein comprise computer based systems for managing financial assets, the concepts of the invention could be applied to the management of any assets whose use or implementation are subject to a plurality of constraints and/or evaluation factors or any population of solutions whose use or implementation are subject to a plurality of constraints and/or evaluation factors. Thus, the concepts of the invention could be implemented in computer based systems to optimize insurance quotations, to optimize cashflow management and/or projections, to optimize a population of technical solutions to a technical problem such as a complex engineering problem. By way of example, one such engineering problem would be optimizing management of plasma generation and/or flow in a fusion reactor chamber.

The server system 26 is itself connected to one or more dealer or broker systems 30 through which financial assets can be purchased from and sold to financial institutions 22 or the like. The server system 26 comprises a processor 34, at least one memory 36 storing machine readable instructions which, when implemented by the processor 34, configures the processor 34 to implement the methods of the invention as herein described and to generate a graphical user interface accessible to the client devices 12. The server system 36 also includes a system database 38 for storing client account data, fund asset data, transaction data and all other data necessary for functioning of the server system 36. The system database 38 may be embodied in the server 36 or comprise a separate device connected to the server 36 via a communications network such as the internet 24. In addition, the system of FIG. 1 may include one or more market information databases 40 for providing real time or near real time asset valuation data to the server system 26, the advisor and broker systems 28, 30 and the client devices 12. In some embodiments, the broker systems 30 provide the real time or near real time asset valuation data.

The processor 34 of the system 26 is configured to receive input data from the plurality of client devices 12 and to receive real time or near real time financial data from the system database 38.

The client devices 12 may comprise desktop computers, laptops, tablet computers, smart phones or any other suitable client devices 12 providing access to the server system's graphical user interface by which a client (investor) may manage their financial investments. The system 26 can provide a suitable graphical interface to any suitably enabled electronic processing device to enable said client device 12 to interact with the system 26 over a suitable communications network 24. The system 26 preferably communicates through a computer network such as the internet 24, but, in some embodiments, private communications networks may be utilised.

The processor 34 is preferably configured to automatically identify a combination of assets comprising a portfolio for a client device 12 based on a set of parameters and/or constraints. The parameters and/or constraints may be input by the client device 12. Parameters and/or constraints may include any one or more of maximum single investment weight, maximum asset class weight, currency weights, product risk-ratings, investor risk generation, currency type, maximum total investment amount, minimum investment amount for each product, among others. Parameters, e.g.

evaluation factors, for determining a fitness score for a portfolio may include any one or more of Asset Class Allocation Factor (ACA), Asset Correlation Factor (AC), Preferred Asset Factor (PA), Reuse of Existing Assets Factor (REA), Portfolio Performance Factor (PP), Portfolio Volatility Factor (PV), Preferred Currency Factor (PC), FX Minimization Factor (FXM), Investment Preference Factor (IP), and Sharpe Ratio Factor (SR) among others. One purpose of the method of the invention is to find the most optimal portfolio (combination of financial assets) within said set of parameters and/or constraints.

The processor 34 is may be configured to automatically identify a combination of assets comprising a portfolio for a client device 12 by determining an initial portfolio combination of assets based on historical risk and return data or by using an existing portfolio.

Figure 2:
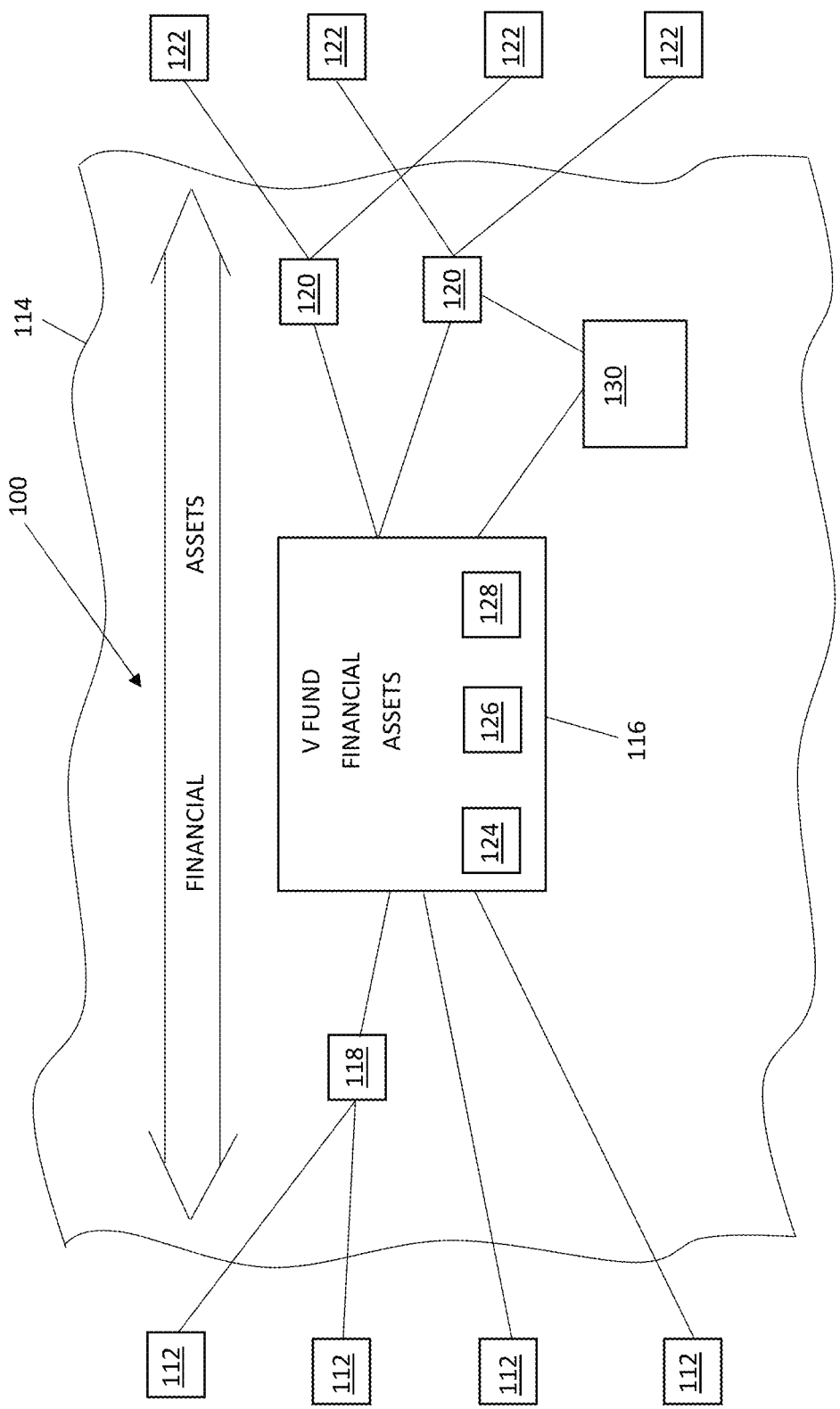
FIG. 2 is a diagram of a second embodiment of a computer based system implementing the method of the invention.

Referring to FIG. 2, shown is a schematic diagram of a second embodiment of a computer based system 100 in which the method of the invention may be implemented. The computer based system 100 comprises a virtual fund system 100 in which the method of the invention can be applied in addition to other asset management functions. By virtual fund is meant that the fund operates in a manner which mimics that of a mutual fund in pooling investors' money to trade financial assets in pursuit of an investment strategy, but without the asset ownership constraints of a mutual fund. The virtual fund system 100 or 'vFund' system 100 as hereinafter referred to comprises a plurality of client devices 112 connected by a communications network such as the internet 114 to the vFund server system 116. The client devices 112 may be directly connected to the server system 116 or may connect through an intermediary system 118 such as a financial advisor system or broker system. It will be understood that a client device 112 is not limited to a device operated by an individual investor, but may be representative of an institutional investor, an advisor investor or any other third party wishing to invest in the vFund 101.

The vFund server system 116 is itself connected to one or more dealer or broker systems 120 through which the vFund 101 purchases and sell financial assets from and to financial institutions 112 or the like. The financial assets managed by the vFund 101 are owned by the investors in proportion to their invested amounts. The vFund server system 116 comprises a processor 124, at least one memory 126 storing machine readable instructions which, when implemented by the processor 124, configures the processor 124 to implement the methods of the invention as herein described and to generate a graphical user interface accessible to the client devices 112. The vFund server system 116 also includes a system database 128 for storing client account data, fund asset data, transaction data and all other data necessary for functioning of the vFund server system 116. The system database 128 may be embodied in the server 116 or comprise a separate device connected to the server 116 via a communications network such as the internet 114. In addition, the system of FIG. 2 may include one or more market information databases 130 for providing real time or near real time asset valuation data to the vFund server system 116 and the advisor and broker systems 118, 120. In some embodiments, the broker systems 120 provide the real time or near real time asset valuation data.

In the embodiment of FIG. 2, the vFund server system 116 manages a single virtual financial assets fund (vFund) 101 on behalf of a plurality of investors using client devices 112 whereas in the embodiment of FIG. 3, as hereinafter described, the server system manages a plurality of vFunds.

The processor 124 of the system is configured to receive input data from the plurality of client devices 112 and to receive real time or near real time data defining current financial asset holdings in a portfolio of the vFund 101 from the system database 128. In response, the processor 124 adjusts the balance of financial asset holdings in the vFund portfolio in response to the received client device input data. It then generates for each client device 112 data updating each client's investor account with the fund to replicate in said client account the same adjusted asset holdings as now held in said fund proportionally in accordance with each client's investment amount. The generated data for an investor may immediately be sent to said investor's client device 112 or sent when the inventor next signs into the system 116. In any event, the data defines which assets managed by the fund 101 are owned by that investor with the technical benefits as hereinbefore and hereinafter described.

The client devices 112 may comprise desktop computers, laptops, tablet computers, smart phones or any other suitable client devices 112 providing access to the vFund system's graphical user interface by which a client (investor) may manage their financial investments. The system 116 can provide a suitable graphical interface to any suitably enabled electronic processing device to enable said client device 112 to interact with the system 116 over a suitable communications network 114. The system 116 preferably communicates through a computer network such as the internet 114, but in some embodiments private communications networks are utilised.

More specifically, the processor 124 is preferably configured to receive real time or near real time market data defining current values for each of the financial asset holdings in the vFund portfolio and other financial assets in the market. As such, the processor 124 may be configured to process said received client input data, said data defining current financial asset holdings in the vFund portfolio, and said market data to generate data defining: (i) sell orders for assets to be sold and the value expected when such orders are executed based on the received market data; and (ii) purchase orders for assets to be purchased and the expected cost based on the received market data. The processor 124 may be configured to submit said sell orders to a broker system 120 or the like for execution and thereafter to receive data from the broker system 120 on value realized for executed sell orders. The processor 124 may also be configured to receive new real time or near real time market data from the broker system 120 or a market information database 130 and, in response, to generate data defining a difference between the value expected from the execution of sell orders and the value actually realized. The generation of value difference data may involve foreign exchange rate data.

The processor 124 may be configured to use the value difference data and the new market data to adjust the pre-calculated purchase orders and thereafter to submit the adjusted purchase orders to the broker system 120 for execution. In response, the processor 124 may be configured to receive data defining newly purchased assets from the broker system 120. The processor 124 is configured to combine data defining said newly purchased assets with data defining assets remaining in said fund portfolio to update the portfolio holdings.

The processor 124 is configured to then generate data for each client device to update each client's investor account to replicate in said client account the same updated asset holdings as held in said updated fund portfolio proportionally in accordance with each client's investment amount. As such, the financial assets are managed by the fund's investment managers, but the actual assets are directly owned by the investors in proportion to their invested amounts. This creates a direct ownership link between the client investors and the financial assets allotted to their respective client portfolios. The technical benefit is that the valuation at any moment in time of an investor's client portfolio is directly linked to the market values of the assets owned by said investor and furthermore the investor is able to access real time or near real time valuation data through any of a number of market data sources to obtain valuations of said assets. Thus, in contrast to a mutual fund where values are tied to an infrequently calculated NAV, the arrangement of the invention provides a virtual fund based investment vehicle, but with direct ownership by investors of the fund's managed assets and access to real time or near real time valuation data.

A further technical benefit is that investors can also access real time or near real time data displaying the composition of the assets managed by the virtual fund.

A yet further technical benefit is that the virtual fund investment managers can much more easily and with less computational complexity centrally determine the overall valuations of the fund's managed holdings again based on real time data.

In the system of FIG. 2, client devices 112 may provide inputs to be processed by the processor 124 to implement the method of the invention.

Figure 3:
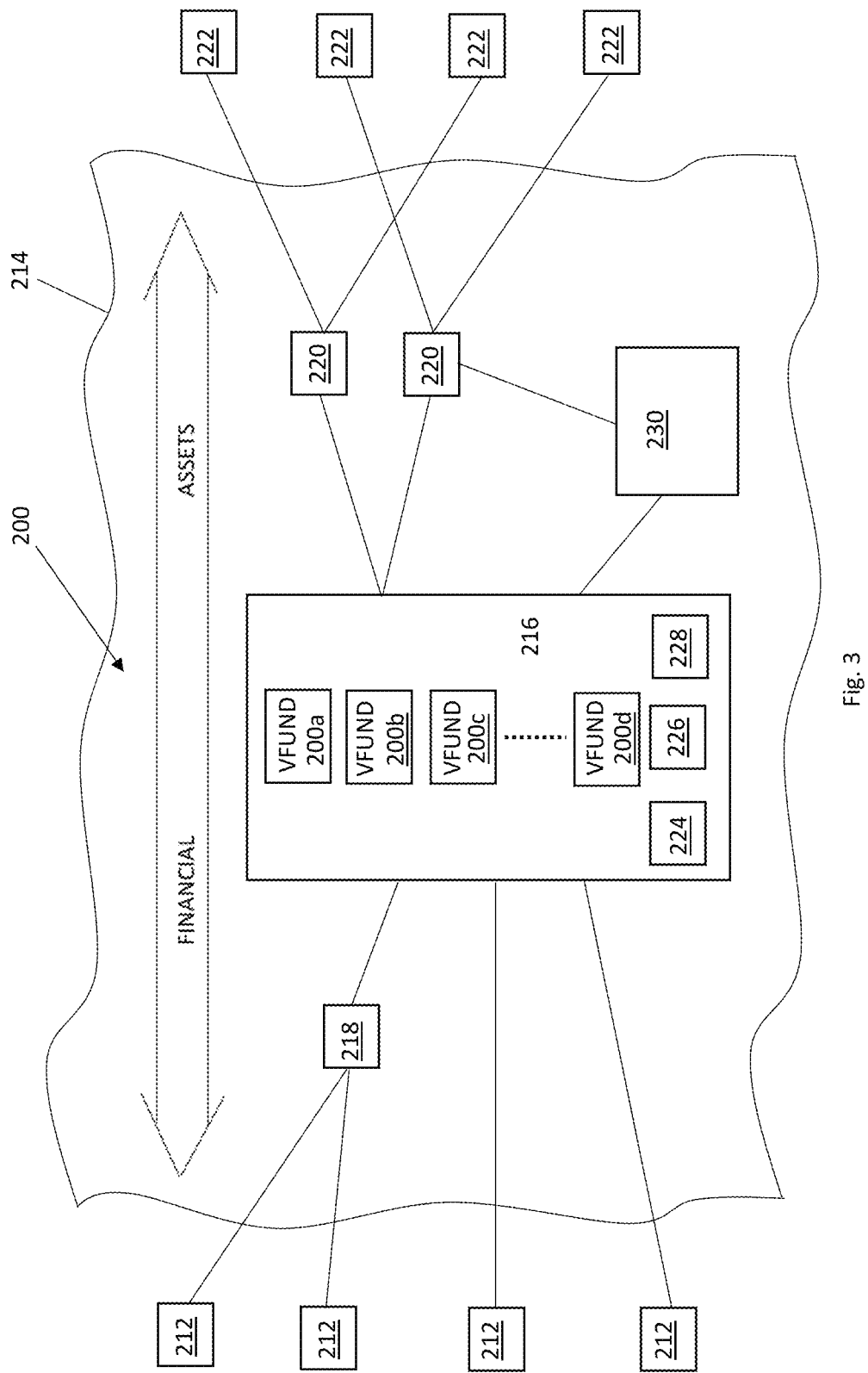
FIG. 3 is a diagram of a third embodiment of a computer base system implementing the method of the invention.

Referring to FIG. 3, shown is a schematic diagram of a third embodiment of a computer based system 200 in which the method of the invention may be applied. The computer based system comprises another embodiment of a virtual fund system 200. The 'vFund' system 200 of this embodiment is generally the same as that of FIG. 2 save for the aspect that the 'A/Fund' system 200 comprises a plurality of vFunds 200a to 200n. As before, a plurality of client devices 212 is connected by a communications network such as the internet 214 to the vFund server system 216. The client devices 212 may be directly connected to the server system 216 or may connect through an intermediary system 218 such as a financial advisor system or broker system. The vFund server system 216 is itself again connected to one or more dealer or broker systems 220 through which the vFund managers purchase and sell financial assets from and to financial institutions 222 or the like for the plurality of vFunds. The vFund server system 216 comprises a processor 224, at least one memory 226 storing machine readable instructions which, when implemented by the processor 224, configures the processor 224 to implement the methods of the invention as herein described and to generate a graphical user interface accessible to the client devices 212. The vFund server system 216 also includes a system database 228 for storing client account data, fund asset data, transaction data and all other data necessary for functioning of the vFund server system 216. In addition, the system of FIG. 3 may include one or more market information databases 230 for providing real time or near real time asset valuation data to the vFund server system 216 and the advisor and broker systems 218, 220.

In the embodiment of FIG. 3, the vFund server system 216 manages a plurality of vFunds 200a to 200n on behalf of a plurality of investors using client devices 212. The processor 224 of the system is configured to receive input data from the plurality of client devices 212 and to receive real time or near real time data defining current financial asset holdings in the plurality of portfolios of the vFund 200a to 200n from the system database 228. In response, the processor 224 adjusts the balance of financial asset holdings in the plurality of portfolios in response to the received client device input data. It then generates for each client device 212 data updating each client's investor account with the fund to replicate in said client account the same adjusted asset holdings as now managed by said plurality of vFund portfolios proportionally in accordance with each client's investment amount(s).

More specifically, the processor 224 is preferably configured to receive real time or near real time market data defining current values for each of the financial asset holdings in the plurality of fund portfolios and preferably other financial assets in the market. The processor 224 is configured to process said received client input data, said data defining current financial asset holdings managed by the plurality of vFund portfolios, and said market data to generate data defining: (i) sell orders for assets to be sold and the value expected when such orders are executed based on the received market data; and (ii) purchase orders for assets to be purchased and the expected cost based on the received market data. The processor 224 is configured to submit said sell orders to a broker system 220 for execution and thereafter to receive data from the broker system 220 on value realized for executed sell orders. The processor 224 may also be configured to receive new real time or near real time market data from the broker system 120 or a market information database 230. The processor 224 defines a difference between the value expected from the execution of sell orders and the value actually realized. The processor 224 is configured to use the value difference data and any new market data to adjust the pre-calculated purchase orders and thereafter to submit the adjusted purchase orders to the broker system for execution. In response, the processor 224 receives data defining newly purchased assets from the broker system 220 and determines from said received data which parts of the newly purchased assets are to be assigned to which of the plurality of the vFund portfolios.

The processor 224 is configured to then allocate said parts of the newly purchased assets to the respective vFund portfolios and to combine data defining said parts of the newly purchased assets with data defining assets remaining in said vFund portfolios to update the portfolio holdings. The processor 224 is configured to then generate data for each client device to update each client's investor account to replicate in said client account the same updated asset holdings as managed by said plurality of vFund portfolios proportionally in accordance with each client's investment amounts in said vFunds.

In the system of FIG. 3, client devices 212 may provide inputs to be processed by the processor 224 to implement the method of the invention.

One technical problem addressed by the embodiments of the invention is how to give client investors in a fund type investment vehicle real time access to valuation data of their invested amounts. The technical solution is to generate data for each client investor to update each client's investor account to replicate in said client account the same updated asset holdings as managed by said plurality of vFund portfolios proportionally in accordance with each client's investment amounts. This creates a direct ownership link by the client investors of the financial assets managed by the vFunds with the ability to thereby provide access to real time or near real time valuation data.

Once connected to the system, all the participants benefit from the enhanced connectivity provided thereby. A client can get up to date information about all the investments in any account and can have access to high quality managers to whom they normally would not have access. An advisor can monetize accounts through portfolio customization and the vFund system, thus charging an asset under management 'AUM' based fee. A financial intermediary can monetize its in-house research and streamline product distribution based on centralized risk models. Other financial institutions such as banks can sell additional financial related products to all linked to the system (e.g. credit cards, mortgages, insurance). An investment manager in a remote part of the world can develop a new client base in regions previously not possible due to physical constraints and/or regulatory hurdles.

Figure 4:
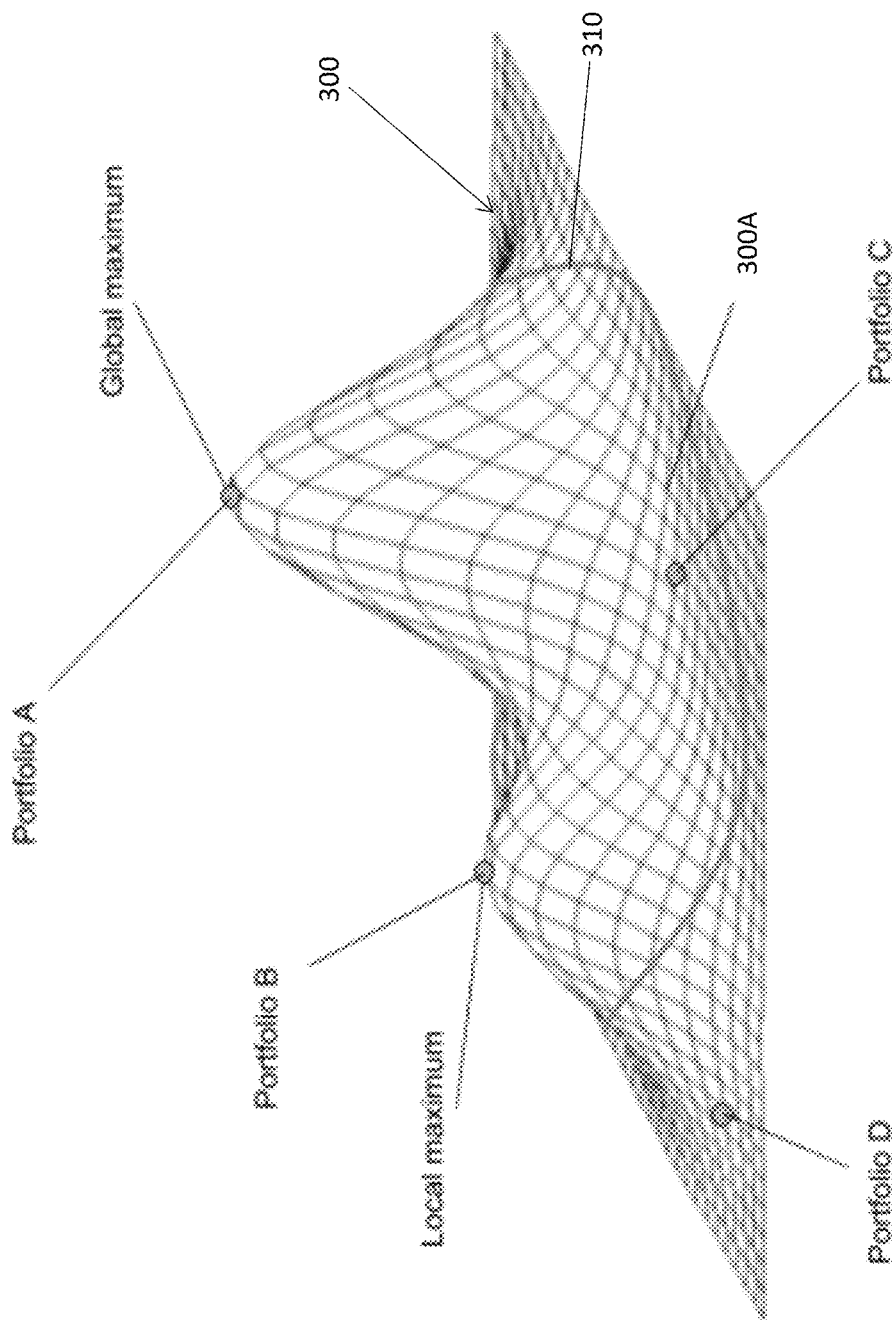
FIG. 4 is a representation of a mathematical solution space for two fitness factors to be evaluated.

FIG. 4 provides a schematic representation by way of example of a mathematical solution space 300 for two fitness factors to be evaluated. The solution space 300 is limited by a number of constraints, hence the feasible solution region 300A bounded by line 310 is smaller than the total area of the solution space 300. In this example, Portfolio A constitutes the portfolio occupying the global maximum which comprises the optimal solution having the best fitness score. In contrast, Portfolio B occupies a local maximum which may appear to some observers with a limited view of the solution space 300 as comprising an optimum solution when, in fact, it comprises an inferior solution, i.e. a solution not having the highest fitness score in the feasible solution region 300A. Portfolio C is a non-optimal solution within the feasible solution region 300A whereas Portfolio D lies outside the feasible solution region 300A and thus is not a valid solution and would be discarded from any consideration.

Figure 5:
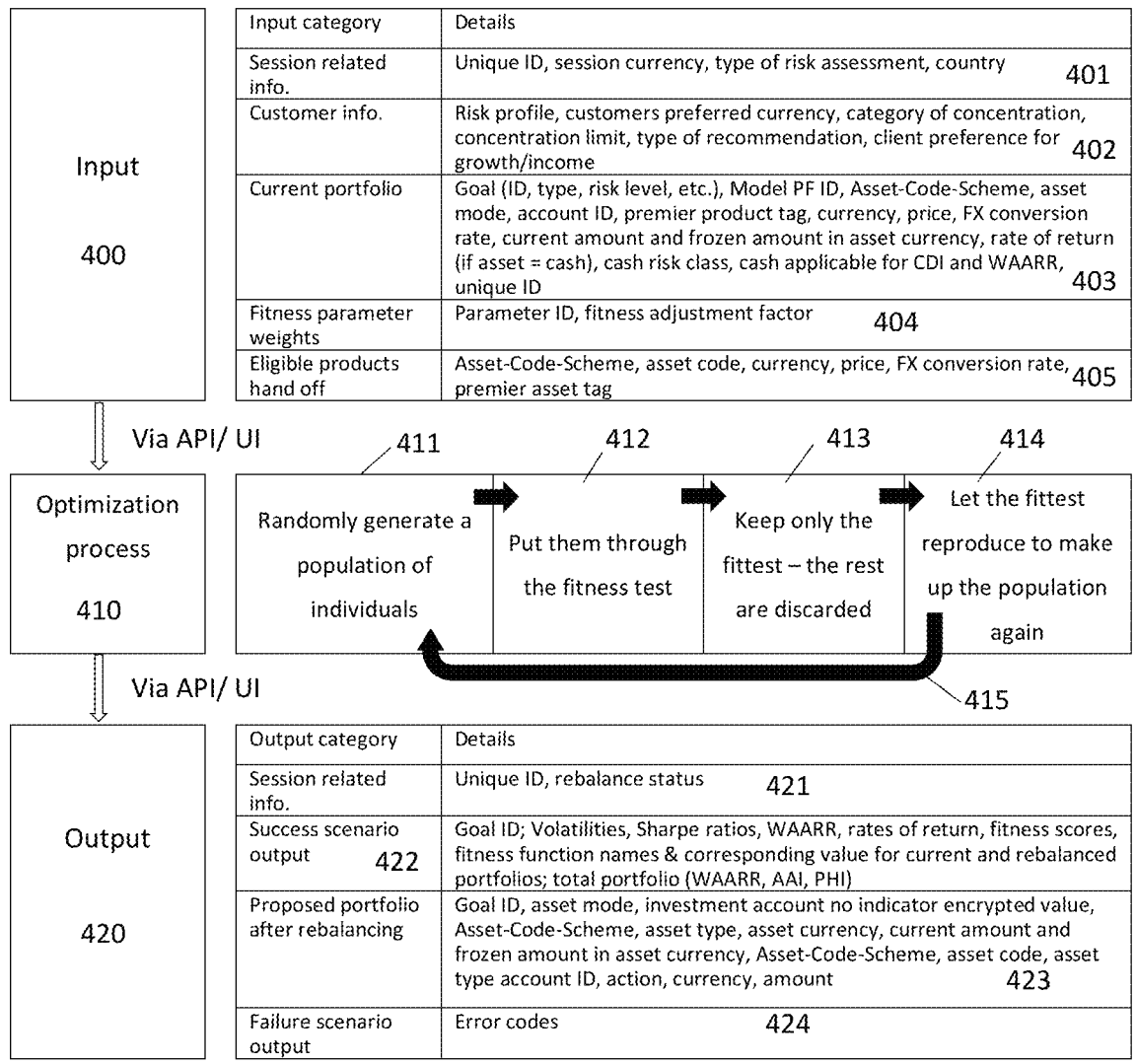
FIG. 5 is a schematic diagram illustrating at a general level the method of the invention.

FIG. 5 provides a schematic representation of the general process of the invention illustrating the inputs 400, the optimization process 410 and the outputs 420. The inputs may be inputted by a user on a client device 12, 112, 212 (FIGS. 1 to 3). The inputs may include session related information 401 such as the user's unique identifier (ID), a selected currency for the session, a selected type of risk assessment, and the user's country of residence among other things. User or customer information 402 may include the user's risk profile, the user's preferred currency, a category of concentration, a concentration limit, a type of recommendation, the user's references for growth and/or income. A further input may comprise the user's current portfolio information 403 including the user's investment goals such as risk level, currency, price, FX conversion rate, current amount and frozen amount in asset currency, rate of return (ROI), cash risk class, etc. Consequently, a plurality of constraints can be derived from the user information 402 and the current portfolio information 403. Further input information may comprise fitness parameter information 404 and fitness parameter weights 405. Eligible product information 405 may also be inputted.

The optimization process 410 comprises in brief a first step 411 of randomly generating a population of individuals or portfolios, a second step 412 of applying a fitness test to each generated portfolio, a third step 413 of keeping only a subset of the generated portfolios comprising those with the upper fitness scores, a fourth step 414 of using the subset of the generated portfolios comprising those with the upper fitness scores to 'reproduce', i.e. to generate a next generation of portfolios, and a fifth step 415 which is to repeat the first to fourth steps a plurality of times until a marginal improvement of a highest ranking next generation portfolio by fitness score falls to below a preset value or amount. The highest ranking next generation portfolio may then be selected as the output 420 for implementation as the user's new rebalanced portfolio where the output data may comprise session related information 421 comprising the user's ID and rebalance status, success scenario information 422 comprising such things as the goal ID, the Sharpe ratios, ROIs, fitness core, fitness function names and corresponding values for current and rebalanced portfolios, and total portfolio. The output 420 may include information 423 defining the user's rebalanced portfolio. Where appropriate, failure scenario output information 424 may also be provided.

Figure 6:
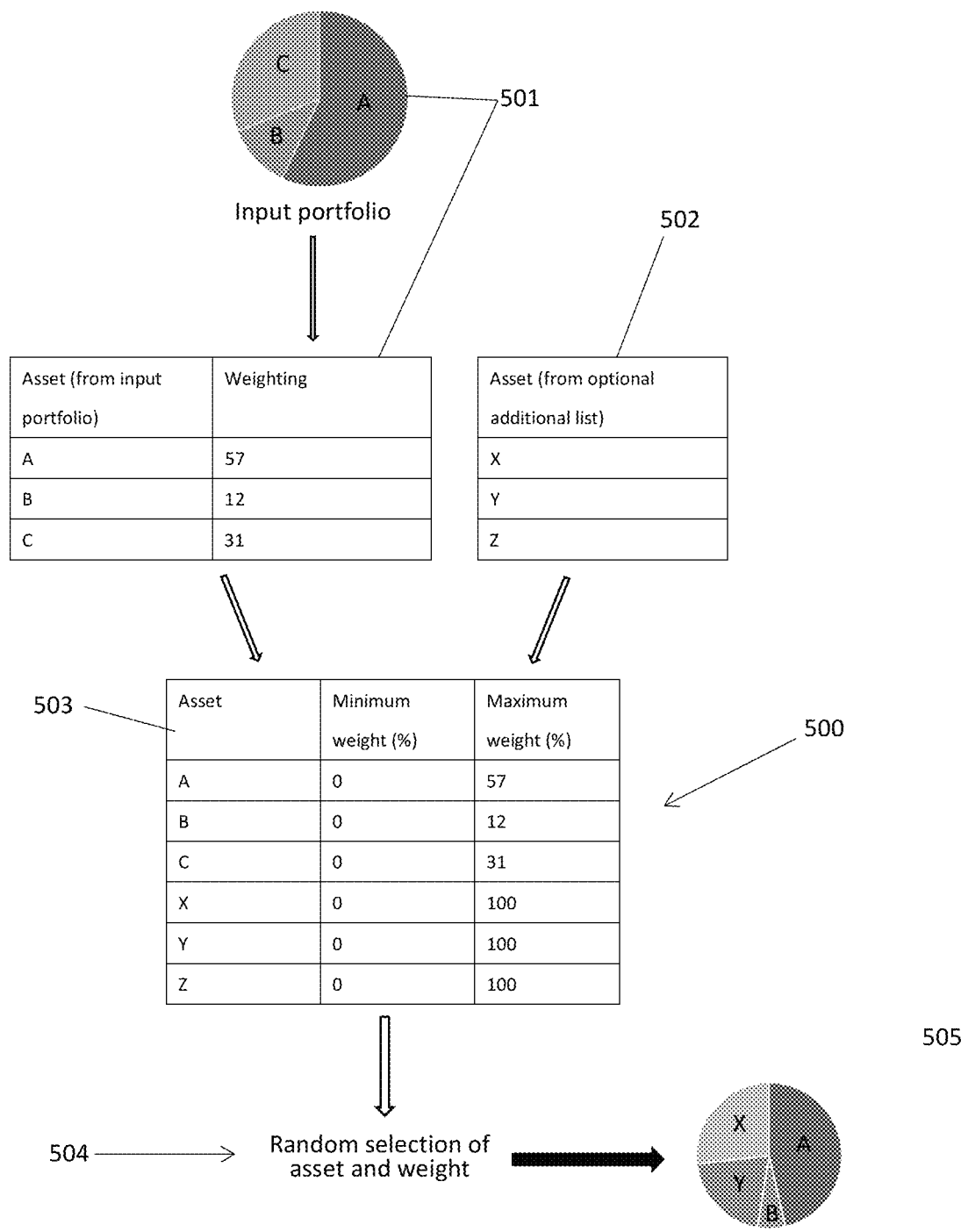
FIG. 6 is a schematic diagram illustrating a method of generating first and next generations of portfolios in accordance with the invention.

FIG. 6 illustrates a method 500 for generating a first generation of portfolios. Preferably, the method commences with an initial portfolio of assets 501, although this is not essential. The initial portfolio of assets 501 may comprise a user's or fund's existing portfolio. Alternatively, it may comprise an empty portfolio or a cash only portfolio or a combination of cash and assets. Cash can be treated as an asset. In FIG. 6, the initial portfolio of assets 501 comprises three assets A, B and C which each have a respective percentage weighting within the portfolio 501. A has a weighting of 57%, B a weighting of 12% and C a weighting of 31%. One of said assets A, B or C may comprise cash. In any event, the sum of the percentage weightings of the three assets A, B and C equals 100%.

The assets of the initial portfolio 501 are considered as forming all or part of a plurality of available assets 503 for generating the first generation of portfolios. Included in the plurality of available assets 503 may be a number of other eligible assets 502 which can be used to generate the first generation of portfolios 506. In this example, the other eligible assets 502 comprise assets X, Y and Z. The plurality of available assets 503 thus comprises the list of assets that could be included in the generated first generation of portfolios 506 by random selection from said list 503 and by random assignment of weightings within set limits.

In the plurality of available assets 503, each of assets A, B and C are limited to a maximum of their original percentage weightings in the initial portfolio 501, although lower or higher maximum limits could be applied. Also, in the plurality of available assets 503, each of the other eligible assets 502 X, Y and Z are limited to a maximum percentage weighting of 100%, although lower maximum limits could be applied to these assets.

The method 500 generates a plurality of first generation portfolios 505 from the plurality of available assets 503. Each first generation portfolio 505 is generated by the steps 504 of randomly selecting one or more of said plurality of available assets 503 and applying a random percentage weighting to each of said randomly selected assets, but where the sum of the random percentage weightings is arranged to equal 100%. The randomly selected percentage weighting for any asset randomly selected from the plurality of available assets 503 is randomly selected from a continuous range of values preferably bounded at its lower end by zero and preferably bounded at its upper end by the maximum limit for that asset in the plurality of available assets 503. However, different lower and upper limits for the continuous range of percentage weightings for any of the assets may be applied. By way of example, FIG. 6 shows a first one 505 of the randomly generated first generation portfolios which comprises different weightings of assets A, B, X and Y. Steps 504 are repeated to randomly generate a predetermined number of first generation portfolios 505.

Figure 7:
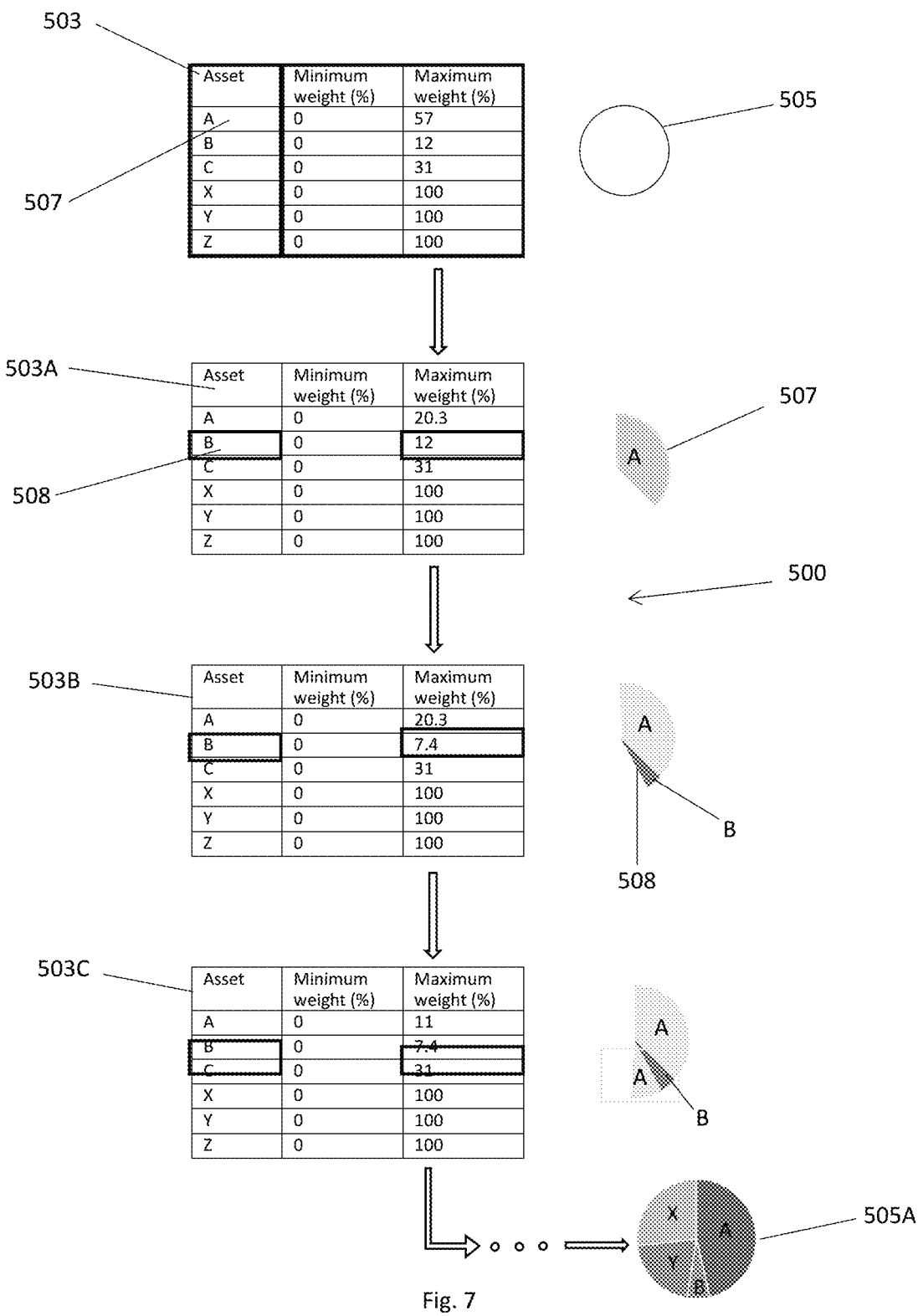
FIG. 7 is a schematic diagram illustrating in more detail the method of FIG. 6.

FIG. 7 illustrates the method 500 of FIG. 6 in more detail with respect to the random selection of assets A and B by way of example. The method 500 starts with an empty first generation portfolio 505. A first asset 507 is randomly selected from the list of available assets 503. In this instance, the first randomly selected asset 507 is A. A randomly selected percentage weighting is applied to asset A where said randomly selected weighting is selected from a continuous range having a lower limit of zero and a maximum limit of 57%. In this instance, the randomly selected weighting for the first asset 507 (A) within its permitted range is 36.7%. Despite the fact that asset A comprises the first randomly selected asset, it is not withdrawn for future random selection from the list of available assets 503. However, as asset A has a maximum available weighting of 57% and the randomly selected weighting already applied to it is 36.7%, the maximum percentage weighting value allowed for it in the list of available assets 503 is reduced to 20.3% thereby preventing any possibility that further random selections of asset A could increase its percentage weighting in the first generation portfolio 506 above 57%. The list of available assets 503 is therefore modified as shown in FIG. 7 at 503A.

As the first randomly selected asset 507 for the first generation portfolio 506 comprised asset A which cannot, through one or more random selections, exceed 57% of the first generation portfolio 505, it is necessary to continue the process of random selection of one or more other assets from the list of available assets 503A. In contrast, if, for example, the first randomly selected asset from list 503 had been asset X then it is possible that this asset could have received a randomly selected weighting of 100% thereby completing generation of this particular one of the first generation portfolios 505. As illustrated in FIG. 7, asset B is the second randomly selected asset 508 from list 503A. In this instance, the maximum weighting available for asset B is 12% in the list of available assets 503A, but, in this example, the randomly selected weighting for the second selected asset 508 (B) is 4.6%. Consequently, the list of available assets 503A is modified to provide list 503B where the weighting for asset B is now limited to a maximum value of 7.4%.

In a next random selection of an asset from the list 503B, asset A is again selected and this time randomly assigned a weighting of 9.3%. Consequently, the list of available assets 503B is modified to provide list 503C where the weighting for asset A is now limited to a maximum value of 11%. The portfolio 505 now has 46% of asset A and 4.6% of asset B so further random selections of assets are required from modified list 503C. The process of random selection of assets and random assignment of weightings within permitted limits continues until portfolio 505 is filled as illustrated in FIG. 7 at 505A.

In a preferred embodiment, the number of first generation portfolios 505 to be generated is preferably 256 and it is preferred that this number is repeated in each next generation of portfolios, although it will be understood that other predetermined numbers of portfolios per generation may be selected. In some embodiments, the initial portfolio such as a user's or fund's existing portfolio comprises the first of the first generation of portfolios 505. The selection of a predetermined number of portfolios for each generation of portfolios may be determined through a qualitative and/or quantitative assessment by experienced personnel.

In the case where the list of available assets comprises n assets from the initial portfolio and a list of other eligible assets, it is possible to generate N polarized portfolios from each of the n assets. A polarized portfolio is created by filling it up with only one eligible asset with its corresponding maximum weight. If the portfolio is not completely filled, other assets from the available asset list will be used to fill it with random processes until the portfolio is completely filled.

Once the first generation of portfolios 505 is generated, a fitness score is calculated for each of the plurality of first generation portfolios 505 where the score for each first generation portfolio 505 comprises an aggregate of a plurality of different evaluation factors. Preferably, the aggregate is a weighted aggregate of the plurality of different evaluation factors. An example of the calculation of fitness scores is illustrated in FIG. 8.

Figures 8, 9:
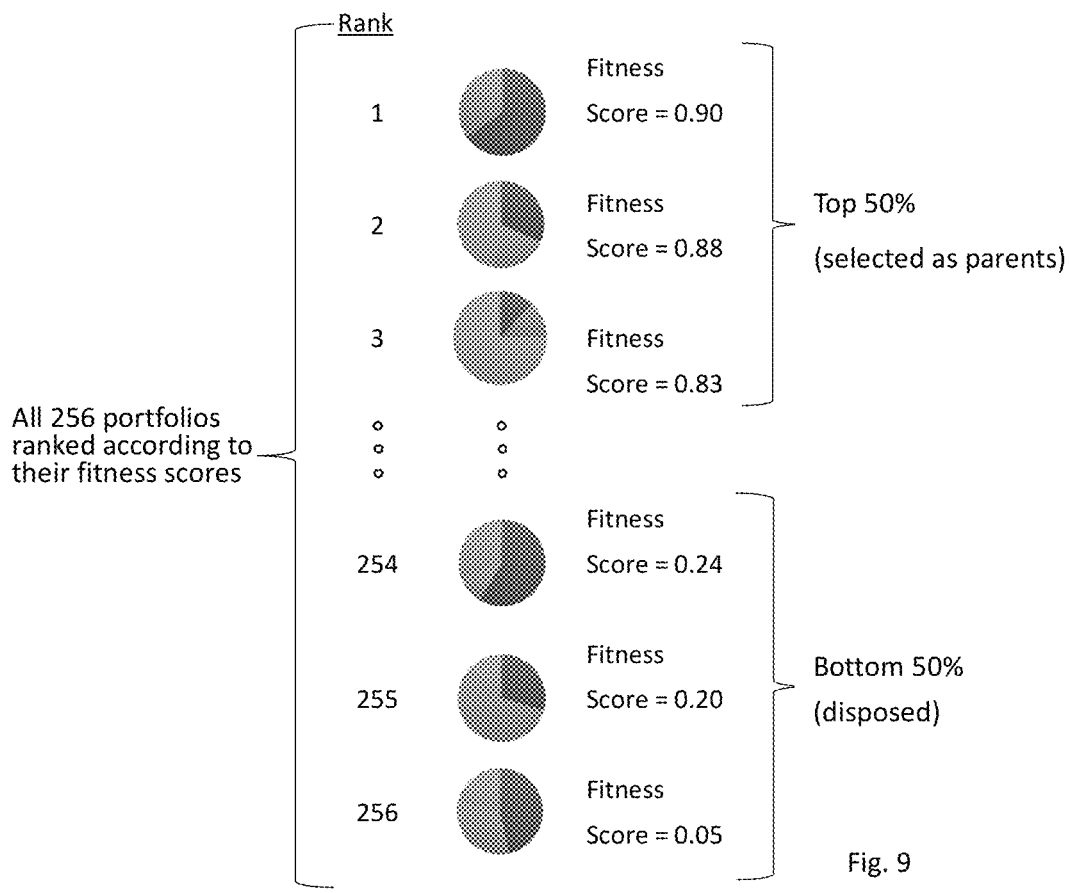
FIG. 8 comprises a table illustrating the calculation of fitness scores.
FIG. 9 is a schematic illustration of the ranking of portfolios by their respective fitness scores.

FIG. 9 illustrates how the first generation of 256 portfolios 505 can be ranked according to their fitness scores and, in the example of FIG. 9, it can be seen that the bottom 50% of said first generation of 256 portfolios are discarded whilst the top 50% are selected as parent portfolios for the generation of a plurality of child portfolios.

Figure 10:
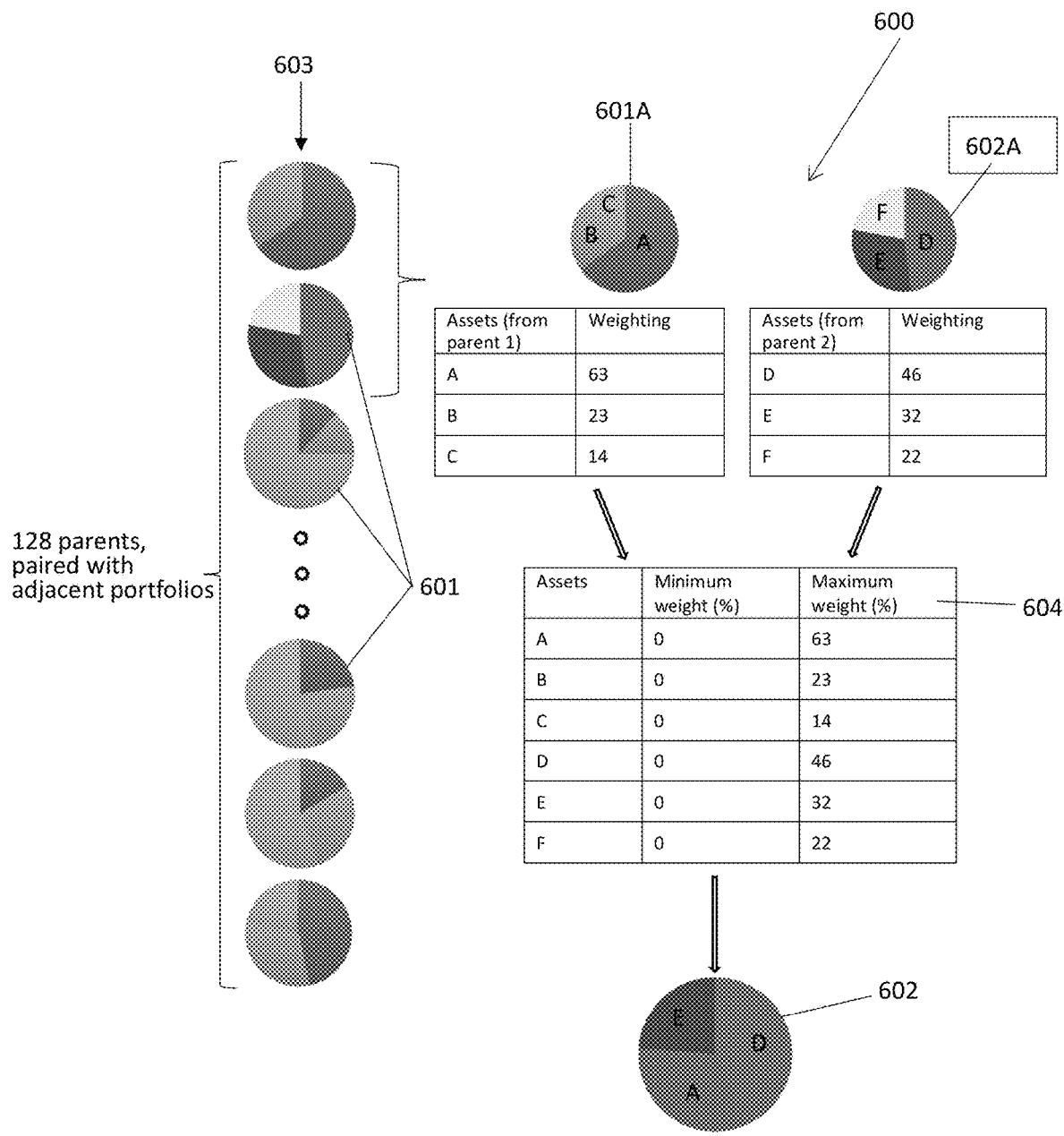
FIG. 10 is a schematic diagram illustrating the generation of child portfolios from parent portfolios.

FIG. 10 illustrates the method 600 of how the 128 first generation portfolios selected as parent portfolios 601 can be utilized to generate preferably an equal number (128) of child portfolios 602. Each child portfolio 602 is generated by two parent portfolios 601 in the ranked list 603 of 128 selected parent portfolios. Preferably, each child portfolio 602 is generated by two adjacent parent portfolios 601 in the ranked list 603. For example, the 1st parent portfolio is combined with the second parent portfolio, i.e. the next adjacent parent portfolio in the ranked list 603, and the second parent portfolio is combined with the third parent portfolio 601 and so on. However, to generate the $128^{th}$ child portfolio, it is preferred to combine the $128^{th}$ parent portfolio with a newly generated parent portfolio, although in some embodiments the $128^{th}$ child portfolio can be generated from the $128^{th}$ parent portfolio combined with a randomly selected one of the $1^{st}$ to $126^{th}$ parent portfolios.

Taking by way of example the generation of the first child portfolio 602 from the first parent portfolio 601A and the second parent portfolio 602A, it can be seen that the assets of the first and second parent portfolios 601A, 601B are combined to create a list of available assets 604 for generation of the first child portfolio 602 by random selection of assets from said list 604 and random selection of weight values from the permitted weight ranges for said assets in said list 604 in a manner generally similar to that illustrated in FIG. 7. By repeating the method 600, the first 127 child portfolios 602 can be generated. The last, i.e. the 128th, child portfolio 602 is generated by the same random selection of assets and weight values, but through a combination of the $128^{th}$ parent portfolio 601 with a newly generated parent portfolio or a random selection of one of the $1^{st}$ to $126^{th}$ parent portfolios 601.

All 128 parent portfolios 601 and all 128 child portfolios 602 together now comprise a next generation set of portfolios 710.

Some of the next generation set of portfolios 710 may be selected to undergo a mutation process whereby, for a selected portfolio in the set, at least one asset of said portfolio is randomly selected and all or a randomly selected percentage weighted portion of said randomly selected asset is replaced by another asset randomly selected from a union of assets comprising a group of all of assets of existing portfolios and/or a group of other eligible assets. The portfolios from the next generation set of portfolios 710 selected to undergo the mutation process may be selected by assigning each of said next portfolios of the next generation set of portfolios 710 with a binary value according to a pre-set mutation rate, where the assigned binary value determines whether a portfolio is selected for the mutation process or not. The probability of being assigned the binary value for selection for mutation would equal the pre-set mutation rate. All 128 parent portfolios 601 and all 128 child portfolios comprising the next generation set of portfolios 710 may be subjected to the mutation selection process.

Figure 11:
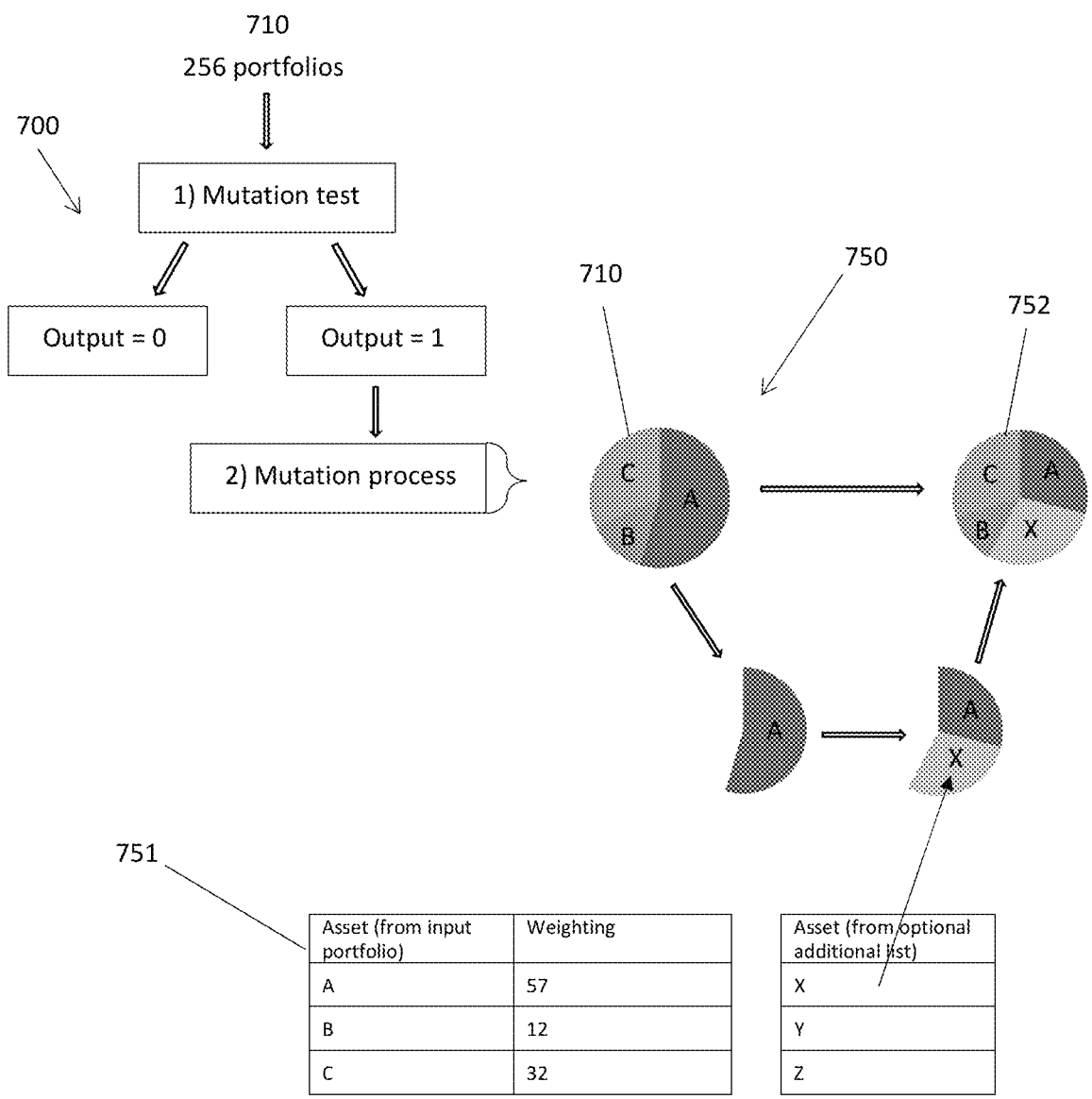
FIG. 11 is a schematic illustration of a mutation selection and mutation process.

The mutation selection 700 and mutation process 750 are each illustrated by FIG. 11 where, in the mutation selection process 700, each of the 256 next generation portfolios 710 is assigned a binary value of "0" or "1" where "0" indicates that said portfolio is not to be subjected to the mutation process 750 and a "1" indicates that the selected portfolio will be mutated as described below. The probability of a next generation portfolio 710 being assigned a "1" equals the pre-set mutation rate, which may be selected by skilled personnel or calculated.

In the mutation process 750, for a selected next generation portfolio 710, a list of available assets 751 is formed preferably comprising the assets of said selected next generation portfolio 710 and/or the other eligible assets X, Y, Z. The mutation process 750 comprises the step of randomly selecting an asset from the assets of said selected next generation portfolio 710. In this instance, asset A from the selected portfolio 710 is randomly selected. In a next step of the mutation process 750, a randomly determined portion of said randomly selected asset A is selected to be replaced by a randomly selected asset from the list of available assets 751. In this instance, asset X is selected from list 751 to replace the portion of asset A to thereby form a mutated version 752 of the selected portfolio 710 where the mutated version 752 comprises a combination of assets A, B, C and X rather than only assets A, B and C prior to mutation.

The next generation of portfolios 710 now includes some mutated portfolios 752. The resulting next generation of portfolios 710, 752 is now itself subject to the fitness assessment and selection processes for creating yet another next generation of portfolios by the method hereinbefore described. This involves calculating a fitness score for each of the next generation of portfolios 710, 752, ranking said next generation of portfolios 710, 752 by their respective fitness scores, selecting a subset of said next generation of portfolios 710, 752 based on their respective scores as next generation parent portfolios, and then using said next generation parent portfolios to generate a plurality of next generation child portfolios. Some of said next generation parent portfolios and next generation child portfolios may be selected to undergo the mutation process to thereby arrive at yet another next generation of portfolios.

Figure 12:
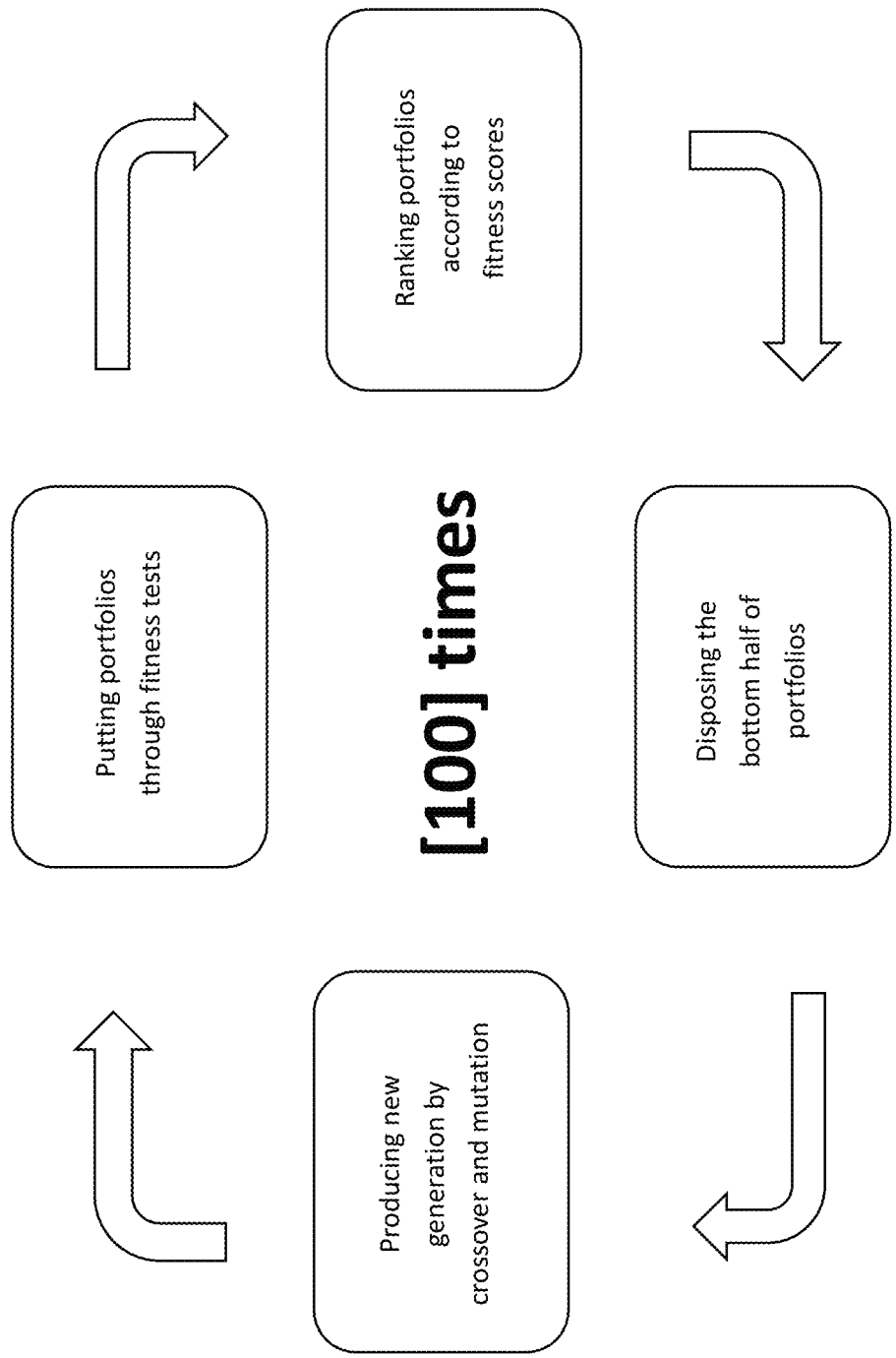
FIG. 12 is a schematic illustration of the iterative process of the invention.

As illustrated in FIG. 12, the steps of ranking, selecting, generating, and calculating a score for each next generation of portfolios is repeated for a plurality of times, e.g. 100, until a marginal improvement in a fitness score calculated for a highest ranking portfolio is less than a predetermined amount preferably over a latter pre-set number, e.g. 10, of said 100 or so iterations. Once this point is reached, the highest ranking portfolio may be selected for implementation.

Preferably, "fitness", i.e. the aggregate fitness score, is calculated as the weighted sum of a number of factors which may comprise mathematically determined formulas based on certain criteria of the given financial assets as set out further below. The corresponding weights can be defined independently for every optimization request or can be set universally. Every factor will make its own contribution to the aggregate fitness score, by looking into a certain aspect/financial quality criterion for the given assets. One factor may have an off-setting or amplifying character with another factor, but in general, the factors are designed to be based on independent/uncorrelated attributes of the assets. The factors are applied on the financial portfolio which is getting optimized, and can take into account all assets within the financial portfolio, including equities, bonds, Mutual Funds, structured notes and cash among other things. Each factor will preferably be assigned with a given weight which determines the magnitude of impact of that factor for the optimization process.

The factors which may be considered for the fitness score are:

1. Asset Class Allocation Factor (ACA)—ACA measures how well the recommended portfolio follows a given target portfolio/target state allocation with respect to Asset Classes.

2. Asset Correlation Factor (AC)—AC measures the correlation of assets within a portfolio.

3. Preferred Asset Factor (PA)—PA measures use of preferred assets (premier funds) in the recommended portfolio. This will primarily be utilized for the identification of assets for sale/redemption.

4. Reuse of Existing Assets Factor (REA)—REA measures re-use of the Investor's existing assets for the new portfolio. The objective is to reduce turn-over of assets in the customer's portfolio and primarily used to assess whether an asset should be kept within a customer's portfolio. Frozen assets will be excluded from the calculation.

5. Portfolio Performance Factor (PP)—PP measures performance of the Target Goal Allocation portfolio. Portfolio Performance along with Portfolio Volatility helps to identify the best possible asset for "Buy" recommendations when more than one asset choices are available.

6. Portfolio Volatility Factor (PV)—PV measures the risk of Goal portfolio. Portfolio Volatility along with Portfolio Performance helps identify the best possible asset for "BUY" recommendation when more than one asset choice is available.

7. Preferred Currency Factor (PC)— PC measures the extent of the Target Goal Allocation portfolio that complies with the investor's preference for the security currency.

8. FX Minimization Factor (FXM)—FXM minimizes the foreign exchange (FX) involved in implementing the recommended portfolio by reducing FX transactions. It measures for each currency (cash and securities denominated in such currency) in the Target Allocation what percentage of such currency is already in the existing portfolio.

9. Investment Preference Factor (IP)—IP measures the optimization of the portfolio to the customer's preference of "Growth" vs "Income".

10. Sharpe Ratio Factor (SR)—SR measures the Sharpe Ratio of the Target Goal Allocation portfolio. The Sharpe ratio is given by the excess return divided by the standard deviation. It describes the amount of excess return earned from enduring each additional unit of volatility.

The fitness score (FS) is preferably calculated as:

$$FS = \sum_{i=1}^{n} w_i F_i$$

where
i=1, 2, . . . , n
$F_i$ is the value of the corresponding factor i
$w_i$ is the corresponding weight of factor i
All factors are scaled from 0.0 to 1.0.

Test Result

The method as hereinbefore described has been tested with 8149 different test cases, using 5 different input portfolios. On average, the improvement of the fitness score was 30%. Testing also included a performance/response time evaluation. This measures the time from sending the request through the given application program interface (API) until a response is received electronically. In general, the findings were that the algorithm runs very fast, even for large portfolio sizes and a large universe. For the 8149 scenarios tested, over 50% of the responses were obtained within 4 seconds. It was found that the fitness of portfolios improves over generations and that there is a greater dispersion in fitness in portfolios of earlier generations, while portfolios of later generations yield generally high fitness.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method for automatically selecting a portfolio where said portfolio comprises a population of solutions, the method comprising the steps of:
   generating, by a processor, a plurality of first generation portfolios from a plurality of available solutions, wherein each of said plurality of first generation portfolios is generated by random selection of one or more of said plurality of available solutions;
   applying, by the processor, a random percentage weighting to each of said randomly selected solutions, but where the sum of the random percentage weightings is arranged to equal 100%;
   calculating, by the processor, a score for each of the plurality of first generation portfolios, the score for each of said plurality of first generation portfolios of assets comprising an aggregate of a plurality of different evaluation factors;
   ranking, by the processor, the plurality of first generation portfolios by their respective scores; and
   selecting, by the processor, a plurality of said first generation portfolios as parent portfolios based on their respective scores and using said parent portfolios to generate a plurality of child portfolios,
   wherein some of the plurality of parent and/or child portfolios are selected to undergo a mutation process whereby, for a selected portfolio, at least one asset of said portfolio is randomly selected and all or a random percentage weighted portion of said randomly selected asset is replaced by another asset randomly selected from a union of assets comprising a group of all of assets of existing portfolios and a group of other eligible assets and
   wherein the parent and/or child portfolios selected to undergo the mutation process are selected by assigning each of said parent and/or child portfolios with a binary value according to a pre-set mutation rate, where the assigned binary value determines whether a portfolio is selected for the mutation process or not.

2. The method of claim 1, wherein the solutions comprise assets.

3. The method of claim 2, comprising the step of receiving data describing an initial portfolio of assets.

4. The method of claim 3, comprising the step of making said initial portfolio of assets a first one of said plurality of first generation portfolios of assets.

5. The method of claim 3, wherein the plurality of available assets comprises assets comprising said initial portfolio of assets and other eligible assets.

6. The method of claim 5, wherein a random percentage weighting applied to a randomly selected asset from said plurality of available assets is limited to a maximum value of its percentage weighting in the initial portfolio of assets or is limited to a predetermined maximum percentage weighting where said asset is one of the other eligible assets.

7. The method of claim 1, wherein the step of calculating a score for each of the plurality of first generation portfolios of assets comprises calculating a weighted aggregate of the plurality of different evaluation factors.

8. The method of claim 1, wherein each of the plurality of child portfolios is generated by two parent portfolios which are adjacent to each other by their ranking scores.

9. The method of claim 8, wherein the assets for a child portfolio are randomly selected from a group of assets comprising the two adjacent parent portfolios.

10. The method of claim 9, wherein a random percentage weighting assigned to a randomly selected asset from the group of parent assets is limited to a maximum value of its original percentage weighting in the respective parent portfolio.

11. The method of claim 1, comprising the steps of:
   calculating a score for each of the plurality of parent and child portfolios;
   ranking the plurality of parent and child portfolios by their respective scores; and
   selecting a subset of said plurality of parent and child portfolios based on their respective scores as next generation parent portfolios and using said next generation parent portfolios to generate a plurality of next generation child portfolios.

12. The method of claim 11, comprising the steps of:
generating each of a plurality of next generation child portfolios from two next generation parent portfolios which are adjacent to each other by their ranking scores; and
selecting some of the plurality of next generation parent and/or next generation child portfolios to undergo the mutation process.

13. The method of claim 11, comprising the steps of:
calculating a score for each of the next generation parent and next generation child portfolios.

14. The method of claim 13, comprising repeating the steps of ranking, selecting, generating, and calculating a score for each next generation of portfolios for a plurality of times until a marginal improvement in a score calculated for a highest ranking portfolio is less than a predetermined amount over a latter pre-set number of iterations.

15. The method of claim 14, wherein said highest ranking portfolio is selected for implementation.

16. A non-transitory computer readable medium storing machine readable code which, when executed by a processor, causes an electronic processing device to implement the steps of:
generating a plurality of first generation portfolios from a plurality of available solutions, wherein each of said plurality of first generation portfolios is generated by random selection of one or more of said plurality of available solutions; applying a random percentage weighting to each of said randomly selected solutions, but where the sum of the random percentage weightings is arranged to equal 100%;
calculating a score for each of the plurality of first generation portfolios, the score for each of said plurality of first generation portfolios of assets comprising an aggregate of a plurality of different evaluation factors;
ranking the plurality of first generation portfolios by their respective scores; and
selecting a plurality of said first generation portfolios as parent portfolios based on their respective scores and using said parent portfolios to generate a plurality of child portfolios,
wherein some of the plurality of parent and/or child portfolios are selected to undergo a mutation process whereby, for a selected portfolio, at least one asset of said portfolio is randomly selected and all or a random percentage weighted portion of said randomly selected asset is replaced by another asset randomly selected from a union of assets comprising a group of all of assets of existing portfolios and a group of other eligible assets and
wherein the parent and/or child portfolios selected to undergo the mutation process are selected by assigning each of said parent and/or child portfolios with a binary value according to a pre-set mutation rate,
where the assigned binary value determines whether a portfolio is selected for the mutation process or not.

17. A computer based system for automatically compiling a portfolio of assets, the system comprising:
a computer readable medium storing machine readable code; and
processor configured to execute said machine readable code to:
generate a plurality of first generation portfolios of assets from a plurality of available assets, wherein each of said plurality of first generation portfolios is generated by random selection of one or more of said plurality of available assets;
apply a random percentage weighting to each of said randomly selected assets, but where the sum of the random percentage weightings is arranged to equal 100%;
calculate a score for each of the plurality of first generation portfolios of assets, the score for each of said plurality of first generation portfolios of assets comprising an aggregate of a plurality of different evaluation factors;
rank the plurality of first generation portfolios of assets by their respective scores; and
select a plurality of said first generation portfolios as parent portfolios based on their respective scores and use said parent portfolios to generate a plurality of child portfolios,
wherein some of the plurality of parent and/or child portfolios are selected to undergo a mutation process whereby, for a selected portfolio, at least one asset of said portfolio is randomly selected and all or a random percentage weighted portion of said randomly selected asset is replaced by another asset randomly selected from a union of assets comprising a group of all of assets of existing portfolios and a group of other eligible assets and
wherein the parent and/or child portfolios selected to undergo the mutation process are selected by assigning each of said parent and/or child portfolios with a binary value according to a pre-set mutation rate,
where the assigned binary value determines whether a portfolio is selected for the mutation process or not.

* * * * *